United States Patent
Daum et al.

[11] 3,903,102
[45] Sept. 2, 1975

[54] 1-CARBAMOYL-BENZIMIDAZOLES

[75] Inventors: Werner Daum, Krefeld-Bockum; Hans Scheinpflug, Leverkusen; Ferdinand Grewe, Burscheid, all of Germany

[73] Assignee: Bayer Aktiengesellschaft, Leverkusen, Germany

[22] Filed: Sept. 5, 1972

[21] Appl. No.: 286,534

[30] Foreign Application Priority Data
Sept. 11, 1971 Germany............................ 2145512

[52] U.S. Cl. ......... 260/307 G; 260/309.2; 424/272; 424/273
[51] Int. Cl.² .......................................... C07D 85/52
[58] Field of Search.................... 260/307 G, 309.2

[56] References Cited
UNITED STATES PATENTS
3,711,503 1/1973 Widdig et al. .................. 260/309.2
3,738,995 6/1973 Adams et al...................... 260/309.2
3,772,322 11/1973 Horlein et al................... 260/309.2

*Primary Examiner*—G. Thomas Todd
*Attorney, Agent, or Firm*—Burgess, Dinklage & Sprung

[57] ABSTRACT

1-carbamoyl-benzimidazoles of the formula

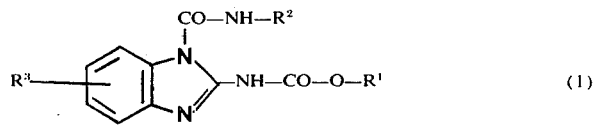

in which
R¹ is lower alkyl or alkenyl,
R² is —(CH₂)ₙ—S—CO—R⁶,

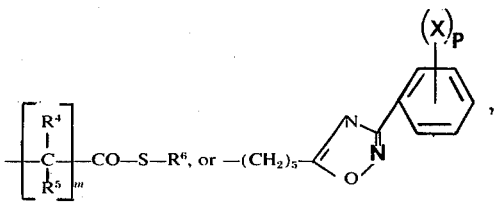

R³ is hydrogen or alkyl with up to 6 carbon atoms,
R⁴ and R⁵ each independently is hydrogen or lower alkyl,
R⁶ is lower alkyl or alkenyl, or phenyl optionally carrying at least one substitutent from the group of halogen, nitro, cyano, lower alkyl and alkoxy,
X is halogen, nitro, cyano, lower alkyl or alkoxy,
m is an integer from 1 to 12,
n is 2 or 3, and
p is an integer from 0 to 5, which possess fungicidal, bactericidal, insecticidal and acaricidal properties.

6 Claims, No Drawings

1-CARBAMOYL-BENZIMIDAZOLES

The present invention relates to and has for its objects the provision of new 1-carbamoyl-benzimidazoles, i.e. 1-(acylthio- or alkyl- or aryl-thiolcarbonylalkylominocarbonyl)-2-alkoxycarbonylamino-benzimidazoles, which possess fungicidal, bactericidal, insecticidal and acaricidal properties, active compositions in the form of mixtures of such compounds with solid and liquid dispersible carrier vehicles, and methods for producing such compounds and for using such compounds in a new way especially for combating fungi, bacteria, insects and acarids, with other and further objects becoming apparent from a study of the within specification and accompanying examples.

As has been known for a long time, zinc ethylene-1,2-bis-dithiocarbamate (Compound A) and N-trichloromethylthiotetrahydrophthalimide (Compound B) in particular are used as fungicides in agriculture and horticulture; these compounds are of great importance amongst the commercially available products (R. Wegler "Chemie der Pflanzenschutz- und Schadlingsbekampfungsmittel" ("Chemistry of Plant Protection Agents and Pesticides"), Volume 2, pages 65 and 108, Berlin/Heidelberg/New York (1970). However, at low use concentrations the action is not always satisfactory.

The present invention provides 1-carbamoyl-benzimidazoles of the formula

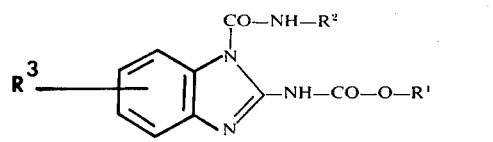

in which
$R^1$ is lower alkyl or alkenyl,
$R^2$ is $-(CH_2)_n-S-CO-R^6$,

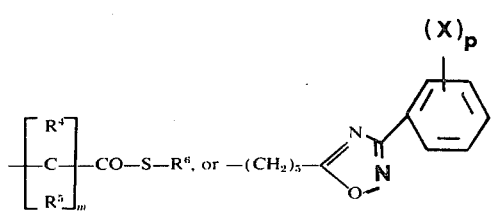

$R^3$ is hydrogen or alkyl with up to 6 carbon atoms,
$R^4$ and $R^5$ each independently is hydrogen or lower alkyl,
$R^6$ is lower or alkenyl or phenyl optionally carrying at least one substituent from the group of halogen, nitro, cyano, lower alkyl and alkoxy,
X is halogen, nitro, cyano, lower alkyl or alkoxy,
$m$ is an integer from 1 to 12,
$n$ is 2 or 3, and
$p$ is an integer from 0 to 5.

Preferably, $R^1$ has up to 4 carbon atoms, especially a methyl, ethyl or isopropyl group, $R^3$ is hydrogen or butyl, $R^4$ and $R^5$ each is hydrogen, $R^6$ is alkyl with up to 4 carbon atoms or phenyl optionally substituted by chlorine, nitro, cyano, methyl, tert.-butyl and/or methoxy, $m$ is 2 to 5 and $p$ is 0.

Surprisingly, the active compounds according to the invention display a higher fungitoxic activity than the abovementioned known compounds; furthermore, the new 1-carbamoyl-benzimidazoles also possess a systemic action. The 1-carbamoyl-benzimidazoles according to the invention thus represent an enrichment of the art.

The substances according to the invention generally exists in a tautomeric equilibrium between the formula (I) shown hereinabove, and formula (Ia) as follows:

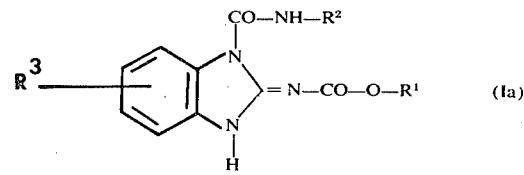

For reasons of simplicity, hereinafter only formula (I) will be shown but it will be understood to include tautomer (Ia) as well; this applies as well to the intermediates where applicable.

The invention also provides a process for the production of a 1-carbamoyl-benzimidazole of the formula (I) or (Ia) in which a. a benzimidazol-2-yl-carbamic acid ester of the formula

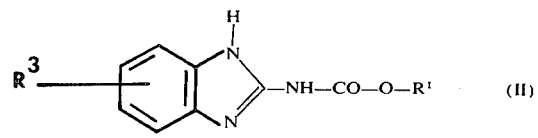

in which
$R^1$ and $R^3$ have the abovementioned meanings, is reacted with an isocyanate of the formula

in which
$R^2$ has the abovementioned meaning, or b. a benzimidazole of the above formula (II) is reacted with a carbamic acid chloride of the formula

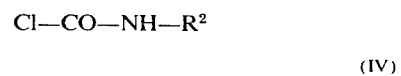

in which
$R^2$ has the abovementioned meaning, or c. a 1-(chlorocarbonyl)-benzimidazol-2-yl-carbamic acid ester of the formula

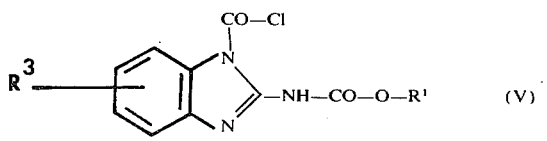

in which
$R^1$ and $R^3$ have the abovementioned meanings, is reacted with an amine of the formula

in which
$R^2$ has the abovementioned meaning.

The compound of formula (V) may be obtained from a compound of formula (II) by reaction with phosgene.

If, according to process variant (a), N-(benzimidazol-2-yl)-carbamic acid methyl ester and ω-butylthiolcarbonylundecylisocyanate are used as the starting substances, the course of the reaction is represented by the following reaction scheme:

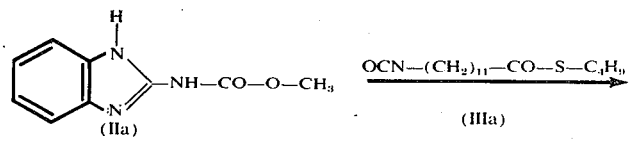

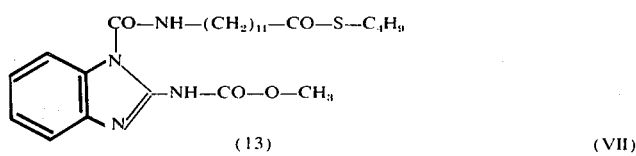

The course of the reaction for process variant (b) follows analogously therefrom:

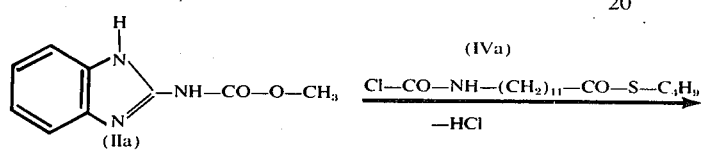

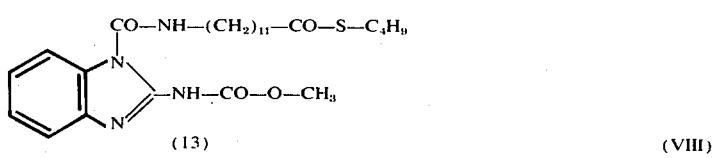

The course of the reaction according to process variant (c) can be represented by the following reaction scheme:

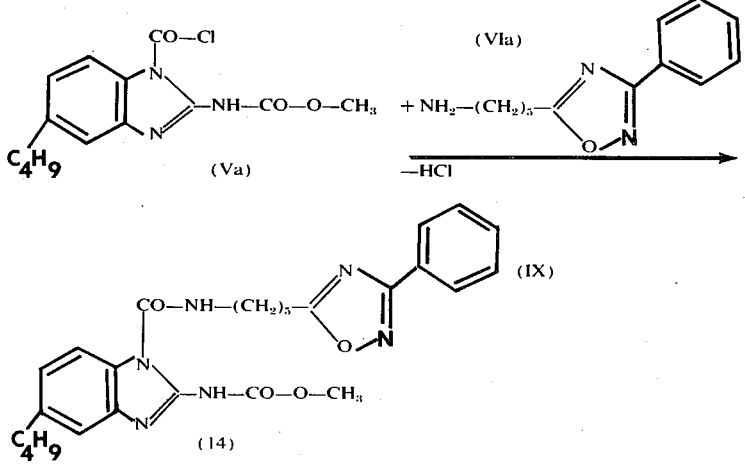

The benzimidazoles required as starting materials in the process variants (a) and (b) are defined by the formula (II). Examples of these benzimidazoles are N-(benzimidazol-2-carbamic acid methyl ester, ethyl ester, propyl ester, isopropyl ester, n-butyl ester, sec.-butyl ester, isobutyl ester, tert.-butyl ester, allyl ester and methallyl ester; 4- or 5-methyl-, 4- or 5-ethyl-, or 4- or 5-propyl-, 4-or 5-isopropyl-, 4- or 5-N-butyl-, 4- or 5isobutyl-, 4- or 5-sec.-butyl-, 4- or 5-tert.-butyl-, 4-or 5-isomyl- and 4-or 5-n-hexyl-N-(benzimidazol-2-vl)-carbamic acid methyl, ethyl, propyl, isopropyl, n-butyl, sec.-butyl, isobutyl, tert.-butyl, allyl and methallyl ester. The benzimidazol-2-yl carbamic acid esters of the formula (II) are largely known or can be prepared according to the processes described in J. Am. Chem. Soc. 56, 144 – 146 (1934), U.S. Patent Specifications Nos. 2,933,502 and 3,010,968 and German Published Specification DOS 1,932,297. Furthermore, the benzimidazol-2-yl-carbamic acid esters can be manufactured according to a process which is not yet known, by reacting 2-amino-benzimidazoles with alkyl- or alkenyl-carbonic acid phenyl esters, with heating, in accordance with the following reaction scheme:

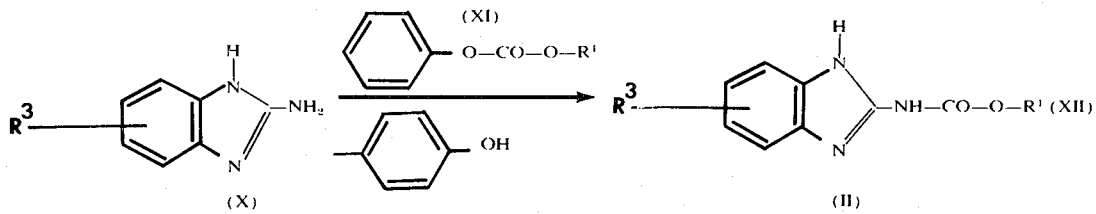

The isocyanates further required as starting substances for process variant (a) are defined by the formula (III).

The carbamic acid chlorides required for the process variant (b) are defined by the formula (IV).

Examples of the isocyoanates and carbamic acid chlorides of formulae (III) and (IV), respectively are ω-methyl-, ω-ethyl-, ω-propyl-, ω-isopropyl-, ω-butyl-, ω-isobutyl-, ω-sec.-butyl-, ω-allyl-, ω-methallyl-, ω-phenyl-, ω-4-tert.-butylphenyl-, ω-3-methylphenyl-, ω-4-methylphenyl-, ω-4-chlorophenyl- and ω-pentachlorophenyl-thiolcarboxymethyl-, -thiol-carboxyethyl-, -thiolcarboxybutyl-, -thiolcarboxypentyl-, -thiolcarboxyphenyl-, -thiolcarboxyundecyl-, -thiolcarboxy-(1'-methyl)-ethyl-, -thiolcarboxy-(1'-methyl)-methyl- and -thiolcarboxy-(1'-isopropyl)-methyl-isocyanate or -carbamic acid chloride.

These compounds have not previously been known but can be prepared according to the following methods:

1. an isocyanatocarboxylic acid chloride is reacted, in a 2-phase mixture consisting of a water-immiscible solvent, such as chloroform or methylene chloride, with an alkali metal mercaptide or an alkali metal thiophenolate, dissolved in water, and optionally in the presence of a catalytic amount of a tertiary amine, at a temperature which lies between the freezing point of the aqueous solution and +4°C; or 2. an alkali metal mercaptide or alkali metal thiophenolate is suspended in an inert solvent and reacted with an isocyanatocarboxylic acid chloride at a temperature which is preferably below +4°C, or 3. a mixture of stoichiometric amounts of a mercaptan or thiophenol with a tertiary amine, for example quinoline, is reacted with an isocyanatocarboxylic acid chloride in an inert solvent, for example methylene chloride, toluene, low-boiling boiling or petroleum ether, at a temperature which is preferably below +4°C.

Some of the isocyanatocarboxylic acid chlorides are disclosed in J. Org. Chem. 31, 142 – 146 (1966); German Published Specification DAS 1,222,919: Japanese Patent Specification No. 21,330 (1967) and British Patent Specification No. 646,033 and all can be prepared according to known processes.

The 1-(chlorocarbonyl)-benzimidazol-2-yl-carbamic acid esters required for process variant (c) are defined by the general formula (V). The compounds of the formula (V) may be obtained by reaction of benzimidazol-2-yl-carbamic acid esters of formula (II) with phosgene in a manner which is generally known (compare, on this topic, the data in column 11 of U.S. Patent Specification NO. 3,541,213).

The amines required for process variant (c) are defined by the general formula (VI).

As further examples of isocyanates, carbamic acid chlorides or amines of the formulae (III), (IV) and (VI), there may be mentioned: 3-phenyl-, 3-(2'-chlorophenyl)-, 3-(4'-chlorophenyl)-, 3-(3'-nitrophenyl)-, 3-(3'-nitro-6'-chlorophenyl)-, 3-(3'-tolyl)- and 3-(4'-methoxyphenyl)-1,2,4-oxdiazol-5-yl-pentyl-isocyanate, -carbamic acid chloride or -amine. The preparation of the amines, which are new, is described in German Patent Application NO. P 21 45 513.0, Le A 18 898. The compounds are obtained if amidoximes are reacted with cyclic imide or amide compounds; thus, for example, by reaction of caprolactimemethyl-ether with benzamid- oxime at 110° to 220°C, while distilling off methanol, 3-phenyl-5-(ω-aminopentyl)-1,2,4-oxidazole is obtainable as an almost colorless oil which can be purified by high vacuum distillation. From the amines, carbamic acid chlorides and isocyanates can be manufactured in a generally known manner and the latter can be used for the process variants (b) or (a) respectively.

As further examples of isocyanates or carbamic acid chlorides of the formulae (III) or (IV), there may be mentioned: ω-benzoyl-, ω-2-chlorobenzoyl-, ω-3-chlorobenzoyl-, ω-4-chlorobenzoyl-, ω-2,4-dichlorobenzoyl-, ω-3-methylbenzoyl-, ω-4-methylbenzoyl-, ω-4-methoxybenzoyl- and ω-(2,2-dimethylpropionyl)-thiolethyl-isocyanate or -carbamic acid chloride or -thiolpropyl-isocyanate or -carbamic acid chloride. The preparation of the hitherto unknown thiolester-isocyanates is described in German Patent Application No. P 21 45 514, Le A 13 899. The compounds may be obtained if 1,3-S,N-ring compounds are reacted with phosgene in the presence of hydrogen chloride aceptors in aqueous solution or suspension; thus, for example, benzoic acid β-isocyanatoethyl-thiol ester can be manufactured by reaction of Δ²-2-phenyl-thiazoline with phosgene in the two-phase solvent mixture of methylene chloride-sodium hydroxide solution, in the temperature range of -5° to 0°C, with vigorous stirring.

The process variant (a) is appropriately carried out in an inert organic solvent, such as dimethylsulfoxide, dimethylformamide, dimethylacetamide, acetone, methyl ethyl ketone, diethyl ketone, tetrahydrofuran, ether, methylene chloride, chloroform, toluene, acetonitrile, benzonitrile, chlorobenzene or methyl acetate. The reaction is generally effected in the temperature range of —20° to +60°C. preferably at 0° to 30°C. One may add compounds which catalyze the isocyanate addition. It is also possible to carry out the reaction in a tertiary amine. The reaction products are either sparingly soluble, so that they can be separated off by a simple filtration process, or are separated out by adding petroleum ether or dibutyl ether to the reaction mixtures, if the latter contain diluents which are miscible with petroleum ether. Finally, the compounds according to the invention can also be prepipitated by adding water while cooling, if a diluent miscible with water has been used.

In carrying out process variant (b), the carbamic acid chloride of the formula (IV) may be added to a mixture consisting of the benzimidazol-2-yl-carbamate of the formula (II), an inert organic solvent such as one of those listed in the description of the process variant (a), and a tertiary amine, such as trietylamine, dimethylbenzylamine, diethylaniline, pyridine, picoline or quinoline or an alkaline-reacting substance such as potassium carbonate, sodium carbonate, borax or trilithium phosphate. The reaction temperature is preferably from 0° to +30°C. After completion of the reaction, the chlorides produced may be eluted with cold water and the reaction mixtures may be worked up as in variant (a).

The process variant (c) may be carried out in an inert solvent, such as ether, chloroform, methylene chloride, tetrahydrofuran or toluene. For this purpose, the 1-(chlorocarbonyl)-benzimidazol-2-yl-carbamic acid ester of the formula (V), obtainable from the benzimidazol-2-yl-carbamic acid ester in the presence of a tertiary base and phosgene at a low temperature, may be reacted either with twice the molar amount of an amine of the formula (VI), or with the amine of the formula (VI) and a tertiary amine in a molar ratio 1:1:1.

The compounds according to the invention mostly decompose at the melting point so that no exact melting points can be determined. On the other hand, the IR-spectra show characteristic absorption bands. Thus, the reaction which has occurred in the 1-position of the benzimidazole is indicated by one or two intense CO bands in the region of about $1,710 - 1.745$ cm$^{-1}$.

The active compounds according to the invention display a strong fungitoxic and bacteriotoxic action. They do not damage crop plants in the concentrations required for combating fungi and bacteria and have a low toxicity to warm-blooded animals. For these reason, they are suitable for use as plant protection agents for combating fungi and baceria. Fungitoxic agent in plant protection are employed for combating *Archimycetes, Phycompycetes, Ascomycetes, Basidiomycetes* and *Fungi Imperfecti.*

The active compounds according to the invention not only possess the good properties of outstanding commercial preparations but beyond this also display considerable advantages. These reside above all in the capacity of the substances according to the invention to penetrate into the plant, to be transmitted systemically and to exert a fungitoxic action away from the point of application. They can be absorbed by the seed surface, by the roots and also by above-ground organs of plants after external application. They also possess the advantageous capacity of exerting their action locosystemically, that is to say of exerting a depth effect in the plant tissue and thereby eliminating fungal pathogens which have already penetrated the tissue of the host plant, that is to say of acting curatively.

The active compounds according to the invention also show a protective effect against parasitary fungi and bacteria which attack above-ground parts of plants or attack plants through the soil. They furthermore are active against seedborne pathogens. The active compounds according to the invention are particularly suitable for combating varieties of Venturia, for example apple scab and pear scab, powdery mildew fungi, such as *Podosphaera leucotricha* (powdery mildew of apples), *Erysiphe cichoracearum* and *Erysiphe graminis*, and pathogens in rice, such as *Piricularia oryzae, Pellicularia sasokii* and *Xanthomonas oryzae.*

The active compounds according to the invention are also active against *Botrytis cinerea, Mycosphaerella musicola, Cochliobolus miyabeanus, Cercospora species* and *Alternaria* species.

The active compounds according to the invention are highly effective, and of practical importance, if they are employed as seed dressings or soil treatment agents against phytopathogenic fungi which adhere to the seed or occur in soil and cause seedling diseases, root rots, tracheomycoses or stem, stalk, leaf, blossom, fruit or seed diseases in crop plants, such as *Tilletia caries, Helminthosporium gramineum, Fusarium nivale, Fusarium culmorum, Rhizoctonia solani, Phialophora cinerescnes, Verticillium alboatrum, Fusarium dianthi, Fusarium cubense, Fusarium oxysporum, Fusarium solani, Sclerotinia sclerotiorum, Thielaviopsis basicola* and *Phytophthora cactorum.*

When treating seed, amounts of active compound which are from 0.1 to 10 g per kg of seed, and preferably 0.5 to 5 g, are generally required. For treating soil, amounts of active compound of 1 to 500 g percubic meter of soil, preferably 10 to 200 g, are generally required.

The active compounds according to the invention also possess an insecticidal and acaricidal action, e.g. against *Myzus persicae, Tetranychus urticae,* and the like.

The active compounds according to the instant invention can be utilized, if desired, in the form of the usual formulations or compositions with conventional inert (i.e. plant compatible or herbicidally inert) pesticide diluents or extenders, i.e. diluents, carrier or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. bezene, toluene, xylene, alkyl naphthalenes, etc.), halogenated, especially chlorinated, aromatic hydrocarbons (e.g. chlorobenzenes etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sufonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, bactericides, isecticides and acarides, or rodenticides, nematocides, herbicides fertilizers, growth-regulating agents, etc., if desired, or in the form of particular dosage preparations for specific application made therefrom, such as solutions, emulsions, suspensions, powders pastes and granules which are thus ready for use.

As concerns commercially marketed preparations, these generally contemplate carrier composition mixtures in which the active compound is present in an amount substantially between 0.1–95% by weight, and preferably 0.5–90% by weight, of the mixture, whereas carrier composition mixtures suitable for direct application or field application generally contemplate those in which the active compounds is present in an amount substantially between about 0.0001–10%, preferably 0.01 –1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, perferably 40 to 600 g/hectare, are sufficient. In this process it is possible to use highly concentrated liquid compositions with said liquid carrier vehicles containing from about 20 to about 97% by weight of the active compound or even the 100% active substance alone, e.g. about 20–100% by weight of the active compound.

Furthermore, the present invention contemplates methods of selectively killing, combating or controlling pests, e.g. fungi, bacteria, insects and acarids, and more particularly methods of combating at least one of fungi and bacteria, which comprises applying to at least one of correspondingly (a) such fungi, (b) such bacteria, (c) such insects (d) such acarids, and (e) the corresponding habitat thereof, i.e. the locus to be protected, a correspondingly combative or toxic amount, i.e. a fungicidally, bctericidally, insecticidally or acaricidally effective amount, of the particular active compound of the invention alone or togehter with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentation of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Erysiphe test

| | |
|---|---|
| Solvent: | 4.7 parts by weight acetone |
| Emulsifier: | 0.3 parts by weight alkylaryl polyglycol ether |
| Water: | 95.0 parts by weight |

The amount of the active compound required for the desired concentration of active compound in the spray liquid is mixed with the stated amount of the solvent, and the concentrate is diluted with the stated amount of water containing the stated additions.

Yong cucumber plants with about three foliage leaves are sprayed with the spray liquid until dripping wet. The cucumber plants remain in a greenhouse for 24 hours to dry. They are then, for the purpose of inoculation, dusted with conidia of the fungus *Erysiphe cichoracearum*. The plants are subsequently placed in a greenhouse at 23°–24°C and at a relative atmospheric humidity of about 75%.

After 12 days, the infection of the cucumber plants is determined as a percentage of the untreated but also inoculated control plants. 0% means no infection; 100% that the infection is exactly as great as in the case of the control plants.

The active compounds, the concentrations of the active compounds and the results obtained can be seen from the following Table 1:

Table 1

(Erysiphe test)

| Active Compound | Infection in % of the infection of the untreated control at an active compound concentration of | | |
|---|---|---|---|
| | 0.025% | 0.0062% | 0.00156% |
| Elementary S (wetting sulfur) (known)    (C) | | 72 | 100 |
| 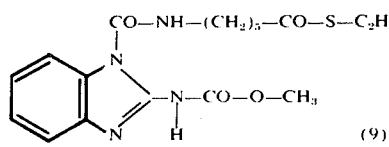  (9) | | 0 | 13 |

Table 1 — Continued (Erysiphe test)

| Active Compound | Infection in % of the infection of the untreated control at an active compound concentration of | | |
|---|---|---|---|
| | 0.025% | 0.0062% | 0.00156% |
| Structure (6): benzimidazole with CO—NH—(CH$_2$)$_5$—[oxadiazole]—phenyl and N—CO—O—CH$_3$ | | 20 | 60 |
| Structure (4): benzimidazole with N—CO—NH—C$_5$H$_{10}$—[oxadiazole]—phenyl and NH—CO—O—CH(CH$_3$)$_2$ | | 40 | 60 |

EXAMPLE 2

Erysiphe test/systemic

| | |
|---|---|
| Solvent: | 4.7 parts by weight acetone |
| Emulsifier: | 0.3 parts by weight alkylaryl polyglycol ether |
| Water: | 95 parts by weight |

The amount of the active compound required for the desired concentration in the liquid to be used for watering is mixed with the stated amount of the solvent, and the concentrate is diluted with the stated amount of water containing the stated additions.

Cucumber plants grown in standard soil are, in the one- to two-leaf stage, watered in one week with 20 cc of the liquid to be used for watering, in the stated concentration of active compound with reference to 100 cc of soil.

The plants so treated are, after the treatment, inoculated with conidia of the fungus *Erysiphe cichoracearum*. The plants are subsequently placed in a greenhouse at 23°–24°C and a relative atmospheric humidity of 70%.

After 12 days, the infection of the cucumber plants is determined as a percentage of the untreated but also inoculated control plants. 0% means no infection; 100% means that the infection is exactly as great as in the case of the control plants.

The active compounds, the concentrations of the active compounds and the results obtained can be seen from the following Table 2:

Table 2

(Erysiphe test/systemic)

| Active Compound | Infection in % of the infection of the untreated control at an active compound concentration (in %) of 30 ppm |
|---|---|
| Structure (9): benzimidazole with CO—NH—(CH$_2$)$_5$—CO—S—C$_2$H$_5$ and N—CO—O—CH$_3$ | 0 |
| Structure (6): benzimidazole with CO—NH—(CH$_2$)$_5$—[oxadiazole]—phenyl and N—CO—O—CH$_3$ | 0 |
| Structure (1): benzimidazole with CO—NH—CH$_2$—CH$_2$—S—CO—phenyl and N—CO—O—C$_2$H$_5$ | 0 |

Table 2 —Continued (Erysiphe test/systemic)

| Active Compound | Infection in % of the infection of the untreated control at an active compound concentration (in %) of 30 ppm |
|---|---|
| 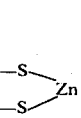 (2) | 0 |
| (5) | 0 |

EXAMPLE 3

Barley mildew test (*Erysiphe graminis var. hordei*)/-systemic (fungal disease of grain shoot)

The active compounds are used as pulverulent seed dressings. These are prepared by extending the particular active compound with a mixture of equal parts by weight of talc and kieselguhr to give a finely pulverulent mixture of the desired active compound concentration.

For dressing the seed, barley seed is shaken with the extended active compound in a closed glass bottle. The seed is sown at the rate of 3 × 12 seeds in 2 cm deep flowerpots, in a mixture of one part by volume of Fruhstorfer standard soil and one part by volume of quartz sand. The germination and emergence take place under favorable conditions in a greenhouse. 7 days after sowing, when the barley plants have developed their first leaf, they are dusted with fresh spores of *Erysiphe graminis var. hordei* and further cultivated at 21°–22°C and 70% relative atmospheric humidity, with 16 hours' exposure to light. The typical mildew pustules form on the leaves within 6 days.

The degree of infection is expressed as a percentage of the infection of the untreated control plants. Thus, 0% denotes no infection and 100% denotes the same degree of infection as with the untreated control. The more active the compound being tested, the lower is the mildew infection.

The active compounds, the concentrations of the active compounds in the seed dressing and the amounts used of the latter, and the percentage infection by mildew are shown in Table 3.

Table 3

Barley mildew test (Erysiphe graminis var. hordei)/systemic

| Active Compounds | Active compound concentration in the dressing in % by weight | Amount of dressing used in g/kg of seed | Infection in % of the untreated control |
|---|---|---|---|
| Untreated | — | — | 100 |
| 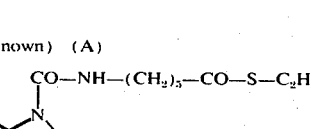 (known) (A) | 30 | 10 | 100 |
| (9) | 30 | 10 | 0 |
| 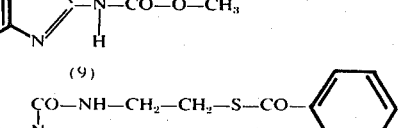 (2) | 30 | 10 | 0 |

EXAMPLE 4

Fusicladium test (systemic)

Solvent: 4.7 parts by weight acetone
Emulsifier: 0.3 parts by weight alkylaryl polyglycol ether
Water: 95 parts by weight The amount of the active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3-4 leaf stage, watered once in one week with 20 cc of the liquid to be used for watering, in the stated concentration of active compound, with reference to 100 cc of soil. The plants so treated are, after the treatment, inoculated with an aqueous conidium suspension of *Fusicladium dendriticum Fuckel* and incubated for 18 hours in a humidity chamber at 18°–20°C and at a relative atmospheric humidity of 100%. The plants are subsequently placed in a greenhouse for 14 days.

15 days after inoculation, the infection of the seedlings is determined as a percentage of the untreated but also inoculated control plants. 0% means no infection; 100% means that the infection is exactly as great as in the case of the control plants.

The active compounds, the concentrations of the active compounds and the results obtained can be seen from the following Table 4:

Young apple seedlings in the 4–6 leaf stage are sprayed with the spray liquid until dripping wet. The plants remain in a greenhouse for 24 hours at 20°C and at a relative atmospheric humidity of 70%. They are then inoculated with an aqueous conidium suspension of the apple scab causative organism (*Fusicladium dendriticum Fuckel*) and incubated for 18 hours in a humidity chamber at 18°–20°C and at a relative atmospheric humidity of 100%.

The plants then again come into a greenhouse for 14 days.

15 days after inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results can be seen from Table 5:

Table 4

Fusicladium test/systemic

| Active Compound | Infection in % of the infection of the untreated control at an active compound concentration of 15 ppm |
|---|---|
| (9) [benzimidazole structure with CO—NH—(CH$_2$)$_5$—CO—S—C$_2$H$_5$ and N—CO—O—CH$_3$] | 0 |
| (6) [benzimidazole structure with CO—NH—(CH$_2$)$_5$—(oxadiazole-phenyl) and N—CO—O—CH$_3$] | 0 |
| (2) [benzimidazole structure with CO—NH—CH$_2$—CH$_2$—S—CO—phenyl and NH—CO—O—CH$_3$] | 0 |
| (5) [benzimidazole structure with CO—NH—(CH$_2$)$_5$—CO—S—phenyl and NH—CO—O—CH$_3$] | 0 |

EXAMPLE 5

Fusicladium test (apple scab) (Protective)

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Table 5

(Fusicladium test/protective)

| Active Compound | Infection in % of the infection of the untreated control at an active compound concentration of 0.00039% |
|---|---|
| 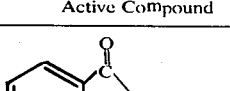 (B) | 69 |

Table 5-Continued (Fusicladium test/protective)

| Active Compound (known) | Infection in % of the infection of the untreated control at an active compound concentration of 0.00039% |
|---|---|
| (9) benzimidazole with CO—NH—(CH$_2$)$_5$—CO—S—C$_2$H$_5$ and NH—CO—O—CH$_3$ | 3 |
| (4) benzimidazole with N—CO—NH—C$_5$H$_{10}$—[C=N—O group with phenyl], NH—CO—O—CH(CH$_3$)$_2$ | 42 |
| (2) benzimidazole with CO—NH—CH$_2$—CH$_2$—S—CO—phenyl and NH—CO—O—CH$_3$ | 0 |
| (3) C$_4$H$_9$-substituted benzimidazole with CO—NH—CH$_2$—CH$_2$—S—CO—phenyl and NH—CO—O—CH$_3$ | 42 |
| (7) C$_4$H$_9$-substituted benzimidazole with CO—NH—(CH$_2$)$_5$—CO—S—phenyl and NH—CO—O—CH$_3$ | 41 |
| (5) benzimidazole with CO—NH—(CH$_2$)$_5$—CO—S—phenyl and NH—CO—O—CH$_3$ | 29 |

EXAMPLE 6

Piricularia and Pellicularia Test

Solvent: 1.9 parts by weight of dimethylformamide
Dispersing agent: 0.1 part by weight of alkylaryl-polyglycol-ether
Water: 98 parts by weight The amount of active compound required for the desired concentration of active compound in the spray liquid is mixed with the stated amount of the solvent and of the dispersing agent and is diluted with the stated amount of water.

2 batches each consisting of 30 rice plants about 2 – 4 weeks old are sprayed with the spray liquor until dripping wet. The plants remain in a greenhouse at temperatures of 22° to 24°C and a relative atmospheric humidity of about 70% until they are dry. One batch of the plants is then inoculated with an aqueous suspension of 100,000 to 200,000 spores/ml of *Piricularia oryzae* and placed in a chamber at 24°–26°C and 100% relative atmospheric humidity. The other batch of the plants is infected with a culture of *Pellicularia sasakii* grown on malt agar and placed at 28° – 30°C and 100% relative atmospheric humidity.

5 to 8 days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control. 0% means no infection; 100% means that the infection is exactly as great in the case of the control plants.

The active compounds, the concentrations of the active compounds and the results obtained can be seen from the following Table 6:

Table 6

(Piricularia (a) and Pellicularia (b) test)

| Active Compound | Infection in % of the infection of the untreated control at an active compound concentration (in %) of | | | |
|---|---|---|---|---|
| | a 0.05 | 0.025 | b 0.05 | 0.025 |
| (B) (known) cyclohexene dicarboximide N—S—C(Cl)$_2$—Cl (CCl$_3$) | pr. 100 cur. 100 | | 100 | |
| (9) benzimidazole with CO—NH—(CH$_2$)$_5$—CO—S—C$_2$H$_5$ and N—CO—O—CH$_3$ | pr. 0 cur. 0 | 0 0 | 0 | 0 |

Table 6 — Continued (Piricularia (a) and Pellicularia (b) test)

| Active Compound | Infection in % of the infection of the untreated control at an active compound concentration (in %) of | | | |
|---|---|---|---|---|
| | a | | b | |
| | 0.05 | 0.025 | 0.05 | 0.025 |
| (6) pr. 0 cur. 0 | 0 0 | 0 | 0 | 0 |
| (4) pr. 0 cur. 0 | 50 | 0 | 0 | |
| (1) pr. 0 cur. 0 | 25 | 75 | | |
| (2) pr. 0 cur. 0 | 0 | 0 | 4 | |
| (5) pr. 0 cur. 0 | 0 50 | 50 | | |

EXAMPLE 7

Seed dressing test/bunt of wheat
(seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g of the chlamydospores of *Tilletia caries* per kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10°C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 7:

liquor is mixed with the stated amount of the solvent and of the dispersing agent, and the concentrate is diluted with the stated amount of water.

30 rice plants about 30 days old are sprayed with the spray liquor until dripping wet. The plants remain in a greenhouse at temperatures of 22° to 24°C and a relative atmospheric humidity of about 70% until they are dry. Needles are then dipped into an aqueous bacterial suspension of *Xanthomonas oryzae* and the plants are inoculated by pricking the leaves. After inoculation, the plants stand in a chamber of 26° to 28°C and 80% relative atmospheric humidity.

10 days after inoculation, the infection in the case of all the leaves injured by pricking, inoculated and previ- Table 7

Seed dressing test/bunt of wheat

| Active compounds | Active compound concentration in the dressing in % by weight | Amount of dressing used in g/kg of seed | Spore germination in % |
| --- | --- | --- | --- |
| Without dressing | — | — | > 10 |
| CH₂—NH—C(=S)—S\\Zn / CH₂—NH—C(=S)—S/ (known) (A) | 10 | 1 | 5 |
| Benzimidazole-CO—NH—(CH₂)₅—CO—S—C₂H₅, N—CO—O—CH₃ (9) | 30 | 1 | 0.05 |
| Benzimidazole-CO—NH—(CH₂)₅-oxazoline-phenyl, N—CO—O—CH₃ (6) | 10 | 1 | 0.005 |
| | 30 | 1 | 0.005 |
| Benzimidazole-CO—NH—C₅H₁₀-oxazoline-phenyl, NH—CO—O—CH(CH₃)₂ (4) | 30 | 1 | 0.05 |

EXAMPLE 8

Bacteria test: *Xanthomonas oryzae*

Solvent: 1.9 parts by weight dimethyl formamide
Dispersing agent: 0.1 part by weight alkylarylpolyglycol ether
Water: 98 parts by weight The amount of active compound necessary for the desired concentration of active compound in the spray ously treated with the preparation is determined as a percentage of the untreated but likewise inoculated leaves of the control plants. 0% denotes no infection; 100% means that the infection is exactly as great as in the case of the control plants.

The active compounds, the concentrations of active compound and the results can be seen from the following Table 8:

Table 8

Bacteria test/Xanthomonas oryzae

| Active compound | Infection in % of the infection of the untreated control at an active compound concentration (in %) of | |
| --- | --- | --- |
| | 0.05 | 0.01 |
| Benzimidazole-CO—NH—(CH₂)₅-oxazoline-phenyl, N—CO—O—CH₃ (6) | 0 | 29 |

EXAMPLE 9

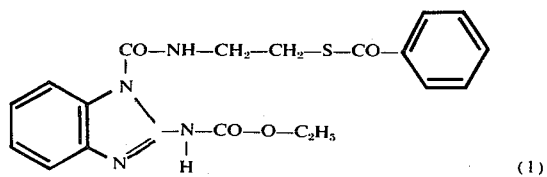

(1)

24.2 g (0.118 mole) of benzimidazol-2-yl-carbamic acid ethyl ester, 150 ml of toluene, 26.5 g (0.128 mole) of ω-benzoylthioethylisocyanate (IR-absorption of the isocyanate in carbon tetrachloride: NCO 2250 – 2270 cm$^{-1}$, CO-(S) 1675 cm$^{-1}$, CH$_2$ 1450 cm$^{-1}$, 5 H (Ar) 690 cm$^{-1}$) and 0.04 g of the tin-II salt of hexanecarboxylic acid are stirred for 16 hours at 22° to 24°C. The crystals are filtered off, washed with toluene and dried at 50°C under a pressure of 0.1 mm Hg. 46.8 g of 1-(benzoylthioethylaminocarbonyl)-2-ethoxycarbonylamino-benzimidazole of melting point 135.5° – 138.5°C are obtained. The yield is 96% of theory. IR-absorption in KBr: NH 3,310 cm$^{-1}$, CO 1730 cm$^{-1}$, 5 H (Ar) 692 cm$^{-1}$.

The following compounds were prepared analogously:

| Formula | Physical properties |
|---|---|
| 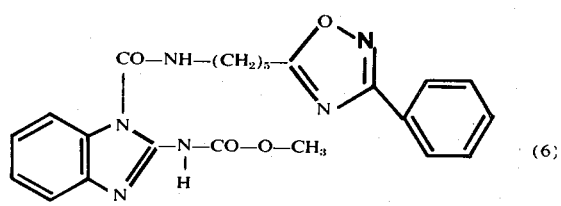 (2) | M.p. 139.5 – 142°C<br>IR-absorption in KBr:<br>NH 3,308 cm$^{-1}$<br>CO 1,710 cm$^{-1}$<br>5 H (Ar) 690 cm$^{-1}$ |
| (structure with C$_4$H$_9$) (3) | M.p. 125 – 126.5°C<br>IR-absorption in KBr:<br>NH 3,290 cm$^{-1}$<br>CO 1,730 cm$^{-1}$<br>5 H (Ar) 690 cm$^{-1}$ |
| (oxadiazole structure) (4) | M.p. 134 – 134.5°C |

EXAMPLE 10 a. 87.8 g of ω-isocyanatocaproic acid chloride, dissolved in 375 ml of methylene chloride, and 20 g of sodium hydroxide in 250 ml of water are added over the course of 50 minutes at −2° to 0°C, with good stirring, to a mixture consisting of 55 g of thiophenol, 375 g of methylene chloride and 250 ml of water. The mixture is stirred for a further 30 minutes. The phases are separated. The organic layer is dried with potassium carbonate while cold, and is distilled. 81.5 g of a fraction, boiling from 148° to 166°C/1.3 mm Hg are obtained. Renewed distillation yields ω-phenylthiolcarbonylpentylisocyanate of boiling point 168°/1.4 mm Hg. IR-absorption in CCl$_4$: NCO 2,270 cm$^{-1}$, CO (—S) 1,715 cm$^{-1}$, CH$_2$ 1,480 cm$^{-1}$, 5 H (Ar) 690 cm$^{-1}$.

b) 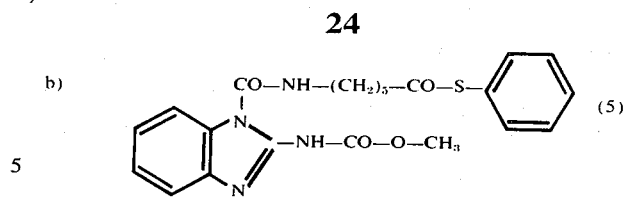

(5)

From the product of (a) and benzimidazol-2-yl-carbamic acid methyl ester by the process of Example 9 there is obtained 1-(phenyl-thiocarbonyl-pentylaminocarbonyl)-2-methoxycarbonylamino-benzimidazole of melting point 122°–125°C, IR-absorption in KBr: NH 3,310 cm$^{-1}$, CO (—NH) 1,732 cm$^{-1}$, CO (—S) 1,708 cm$^{-1}$, 5 H (Ar) 690 cm$^{-1}$.

EXAMPLE 11

(structure with oxadiazole and phenyl)

(6)

The compound is prepared analogously to Example 9, but using dimethylformamide instead of toluene as the solvent. The melting point is 131 – 135°C. IR-absorption in KBr: NH 3,318 cm$^{-1}$, CO 1,725 cm$^{-1}$, 5 H (Ar) 695 cm$^{-1}$.

EXAMPLE 12

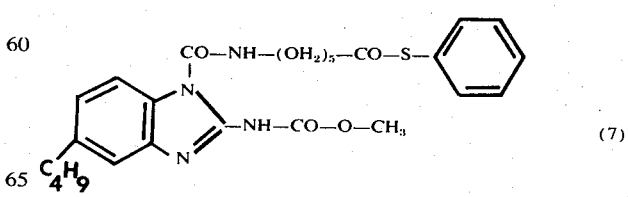

(7)

7 g of 5-butyl-benzimidazol-2-yl-carbamic acid methyl ester, 35 ml of toluene, 7.1 g of ω-phenylthiolcarbonylpentylisocyanate and 20 mg of the tin-II salt of hexanecarboxylic acid are stirred for 17 hours at 22°C. The mixture is filtered and the reaction product is precipitated by adding petroleum ether to the filtrate. The melting point of the resulting compound is 92° – 96°C. IR-absorption in KBr: NH 3,300 cm$^{-1}$, CO (—NH) 1,740 cm$^{-1}$, CO (—S) 1,715 cm$^{-1}$, 5 H (Ar) 690 cm$^{-1}$.

EXAMPLE 13 a. 3 drops of triethylamine and 20 g of sodium hydroxide, dissolved in 250 ml of water, are added to 31 g of ethylmercaptan in 375 ml of methylene chloride. 87.5 g of ω-isocyanatocaproic acid chloride, diluted with 375 ml of methylene chloride, are added dropwise over the course of 1 hour at −3°C. The mixture is stirred for a further 40 minutes. The organic phase is separated off and dried with potassium carbonate while cold. Distillation yields a fraction which passes over at 139° – 170°C/8 mm Hg and which is subjected to a second distillation. The bulk of the material boils at 146°C/8 mm Hg. Yield 45 g. IR-absorption in CCl$_4$: NCO 2,265 cm$^{-1}$, CO (—S) 1,694 cm$^{-1}$, CH$_2$ 1,460 cm$^{-1}$. The product is ω-ethylthiolcarbonylpentylisocyanate.

b) 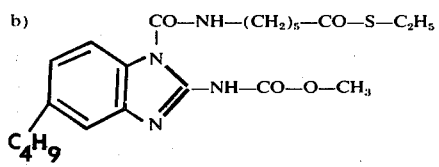

(8)

The compound is prepared from the product of (a) analogously to the description in Example 10. The melting point is 96° – 97°C. IR-absorption in KBr: NH 3,290 cm$^{-1}$, CO (—NH) 1,738 cm$^{-1}$, CO (—S) 1,698 cm$^{-1}$.

EXAMPLE 14:

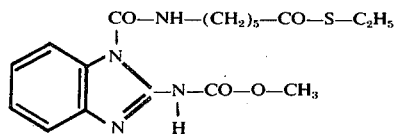

(9)

4 g of benzimidazol-2-yl-carbamic acid methyl ester, 25 ml of dimethylformamide and 5 g of ω-ethylthiolcarbonylpentylisocyanate are stirred at 20°C until the carbamate has dissolved. After 18 hours the mixture is cooled to −10°C and 25 ml of water are then added slowly. The reaction product is filtered off, washed with water and first dried at room temperature and thereafter, when the bulk of the water has been removed, at 50°C under a pressure of 0.1 mm Hg. The yield of the compound melting at 108.5° – 110.5°C is 7.5 g. IR-absorption in KBr: 3,310 cm$^{-1}$, CO (—NH) 1,730 cm$^{-1}$, 1,740 cm$^{-1}$, CO (-S) 1,700 cm$^{-1}$, 4 H (Ar) 758 cm$^{-1}$.

The following were prepared analogously to the above Examples.

| Formula | Physical properties |
|---|---|
| (10) | M.p. 131.5 – 132°C<br>IR-absorption in KBr:<br>NH 3,315 cm$^{-1}$<br>CO (-NH) 1,722 cm$^{-1}$<br>5 H (Ar) 758 cm$^{-1}$ |
| (11) | M.p. 120 – 122°C<br>IR-absorption in CHCl$_3$:<br>NH 3,320 cm$^{-1}$<br>CO (—NH) 1,728 cm$^{-1}$<br>CO(-S) 1,680 cm$^{-1}$ |
| (12) | M.p. 163 – 165.5°C<br>IR-absorption in CHCl$_3$:<br>NH 3,320 cm$^{-1}$<br>CO (-NH) 1,725 cm$^{-1}$<br>CO (-S) 1,668 cm$^{-1}$ |
| (22) | M.p. 120–122°C |

Other compounds which can be prepared in similar fashion include:

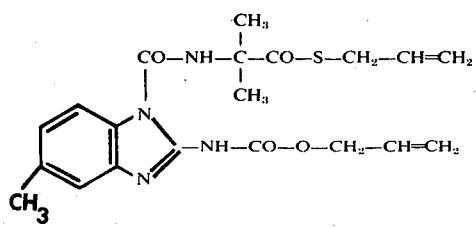
(15)

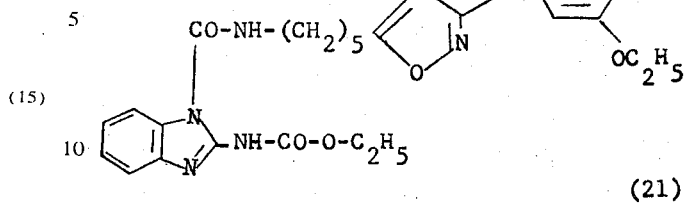
(21)

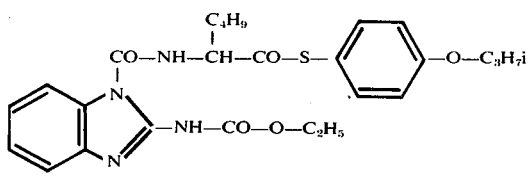
(16)

It will be appreciated that the instant specification and examples are set forth by way of illustration and not limitation, and that various modifications and changes may be made without departing from the spirit and scope of the present invention.

What we claim is:

1. A 1-carbamoyl-benzimidazole selected from the group consisting of

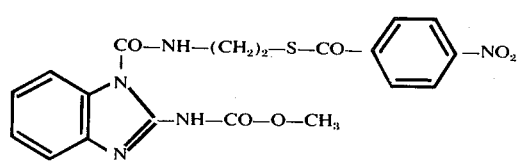
(17)

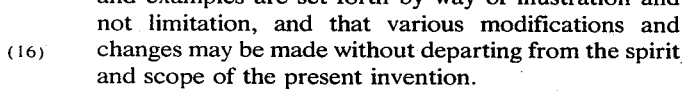
(1)

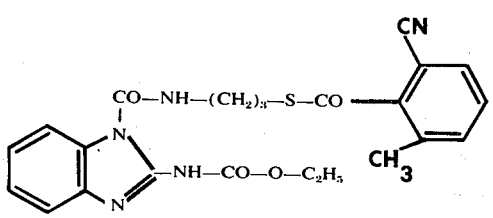
(18)

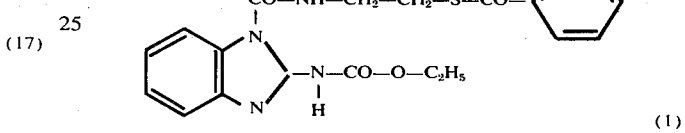
(2)

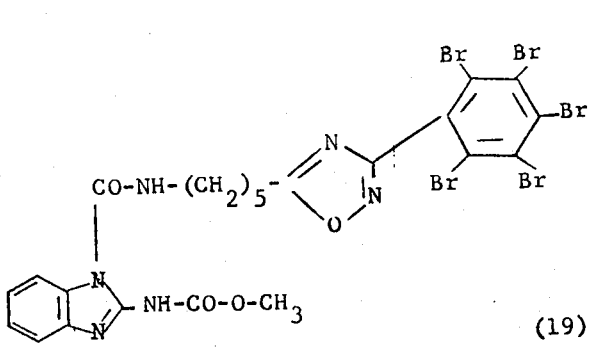
(19)

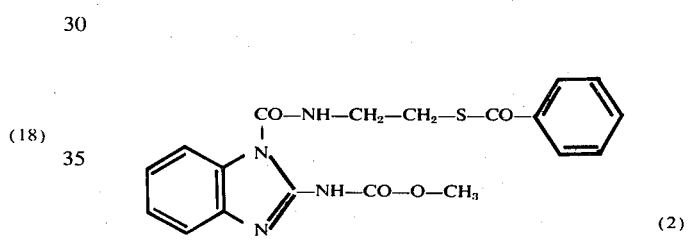
(3)

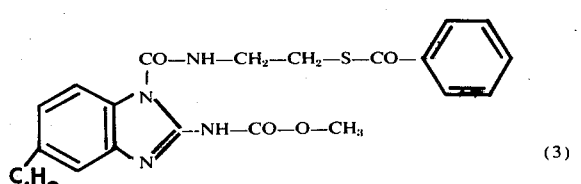
(4)

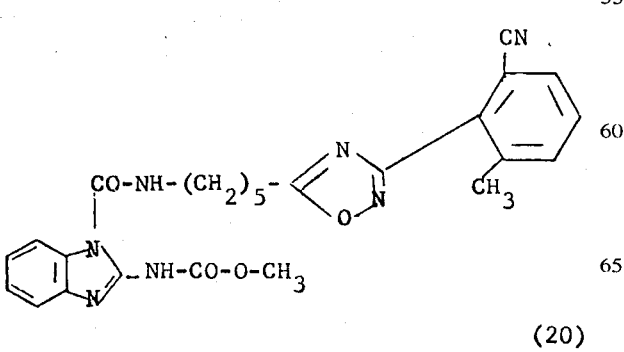
(20)

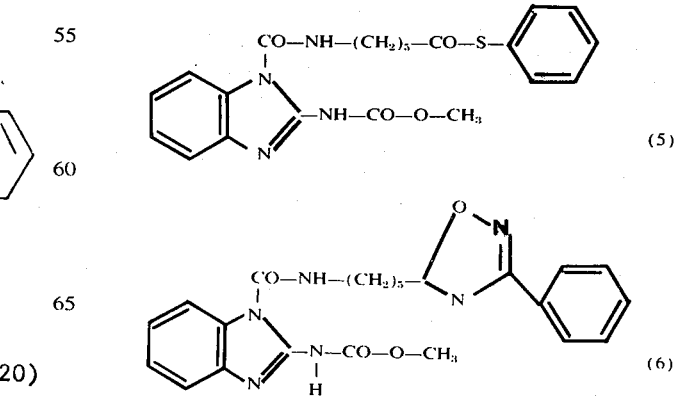
(5)

(6)

29
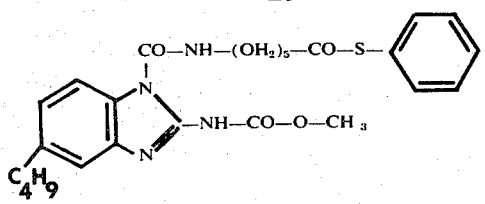 (7)
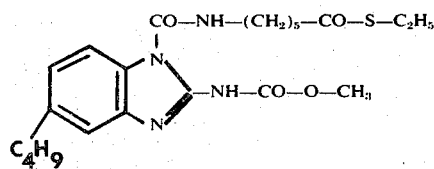 (8)
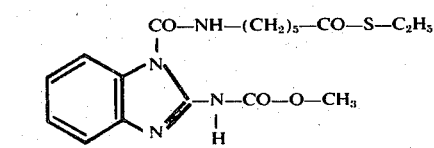 (9)
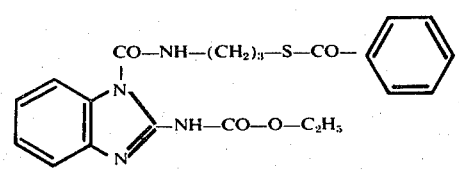 (10)
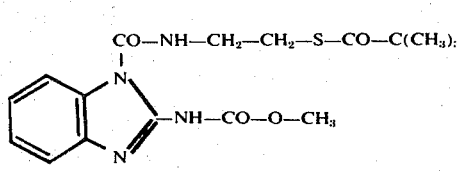 (11)
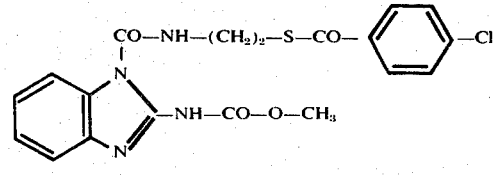 (12)
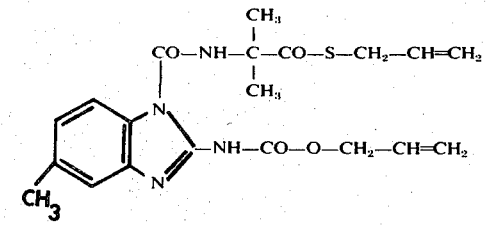 (15)
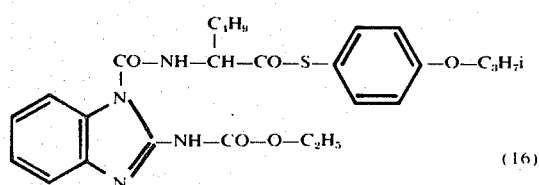 (16)
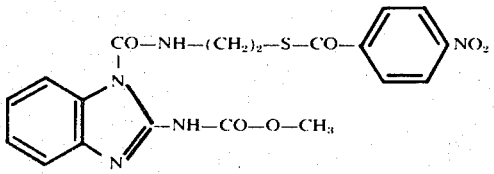 (17)
30
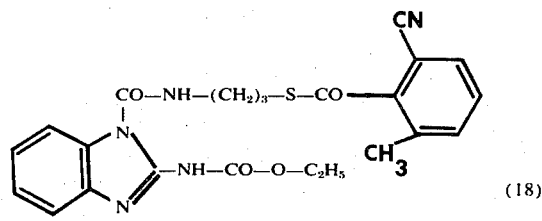 (18)
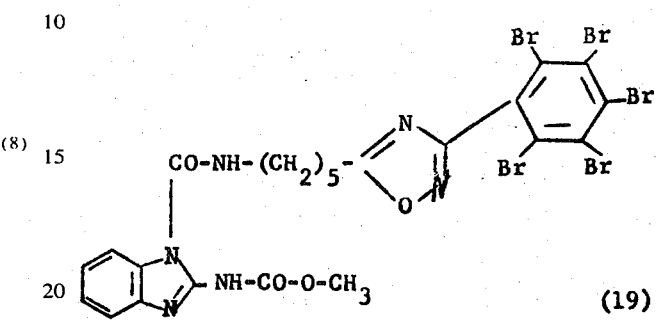 (19)
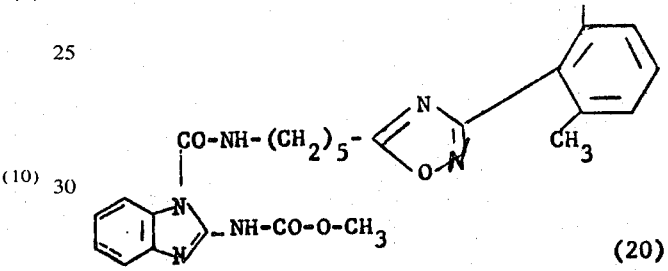 (20)
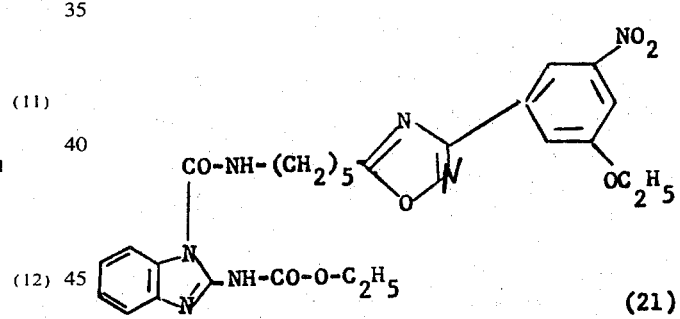 (21)
and
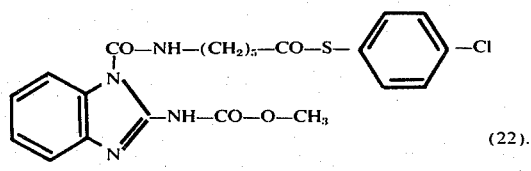 (22).
2. The compound according to claim 1 wherein such compound is 1-(benzoyl-thioethylaminocarbonyl)-2-ethoxycarbonylamino-benzimidazole of the formula:
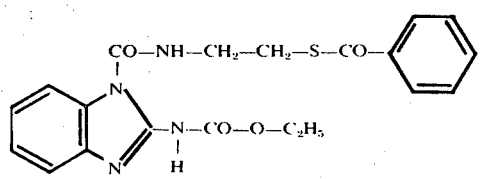 (1).
3. The compound according to claim 1 wherein such compound is 1-(benzoyl-thioethylaminocarbonyl)-2-methoxycarbonylamino-benzimidazole of the formula:

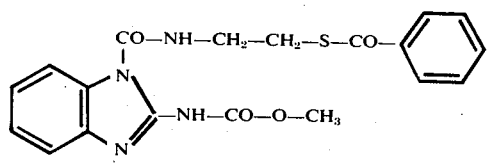

(2).

4. The compound according to claim 1 wherein such compound is 1-(phenylthiolcarbonylpentylaminocarbonyl)-2-methoxycarbonylamino-benzimidazole of the formula:

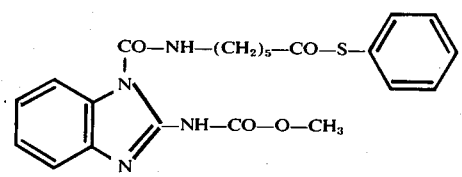

(5).

5. The compound according to claim 1 wherein such compound is 1-[3-phenyl-(1,2,4-oxdiazol)-5-yl-pentylaminocarbonyl]-2-methoxycarbonylamino-benzimidazole of the formula:

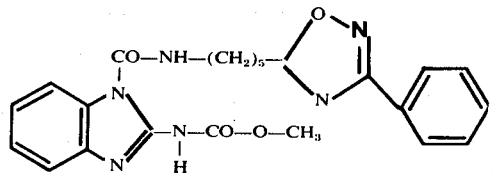

(6).

6. The compound according to claim 1 wherein such compound is 1-(ethylthiolcarbonylpentylaminocarbonyl)-2-methoxycarbonylamino-benzimidazole of the formula:

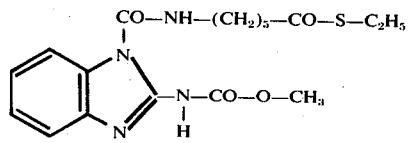

(9).

* * * * *